Patented Aug. 19, 1941

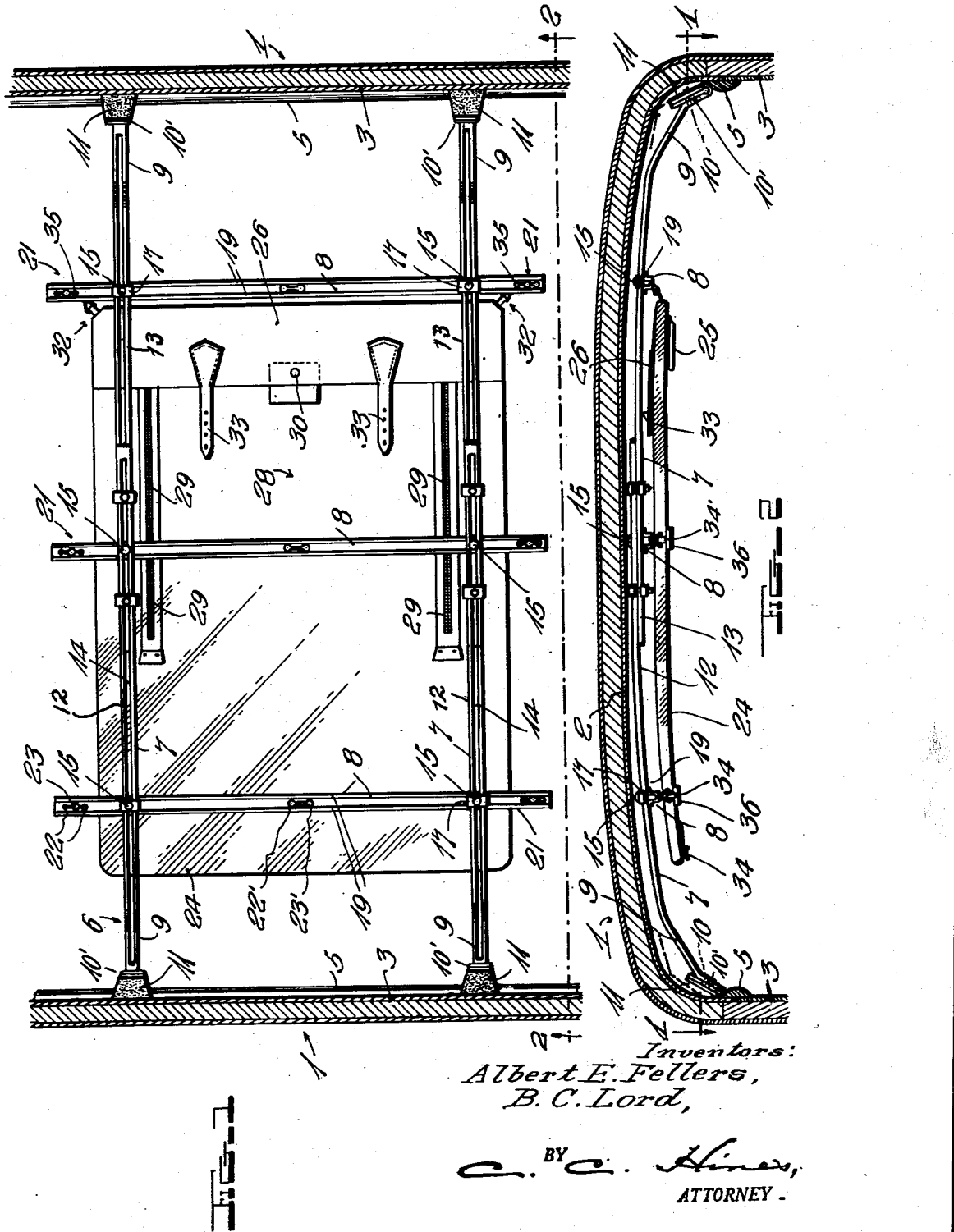

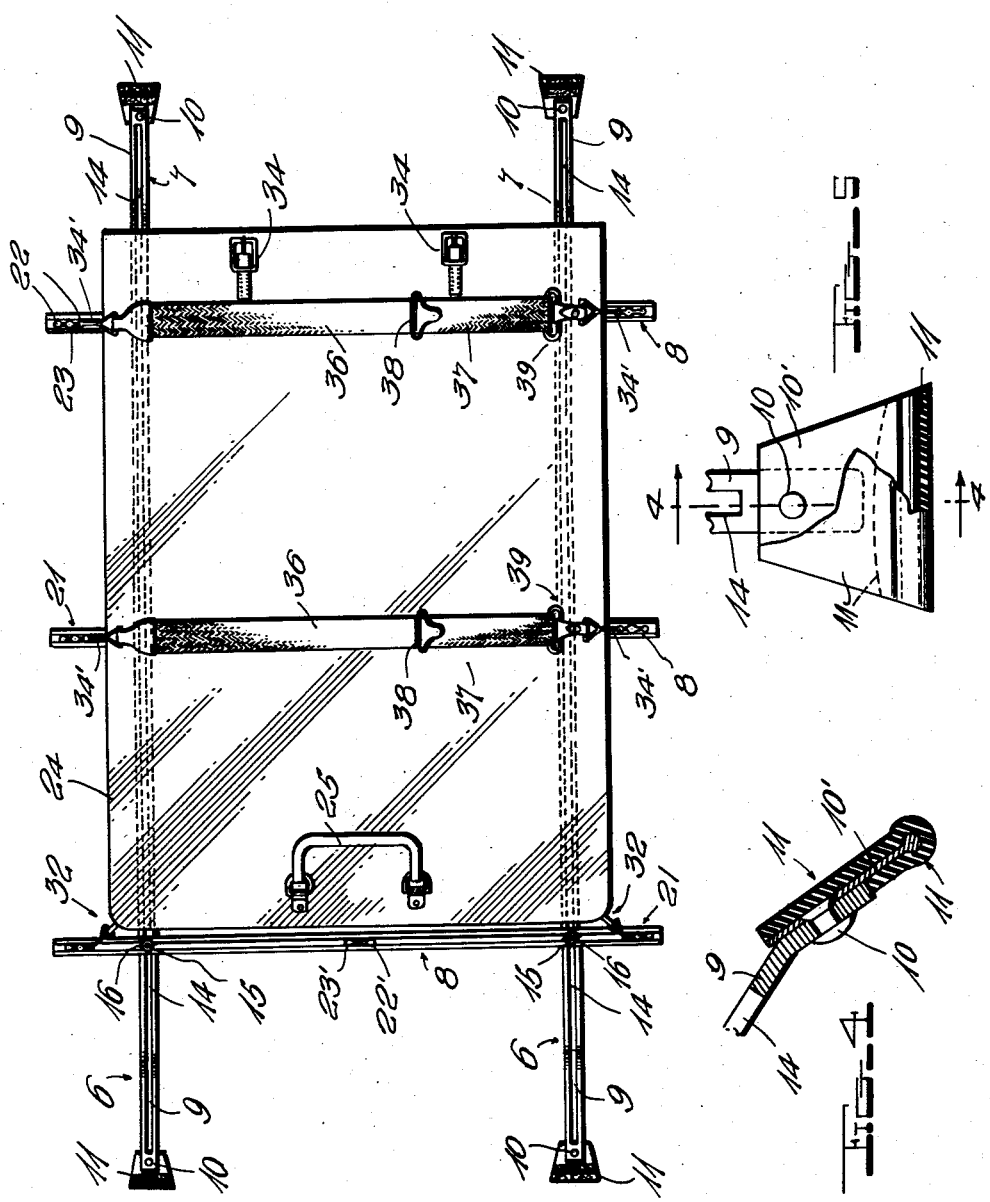

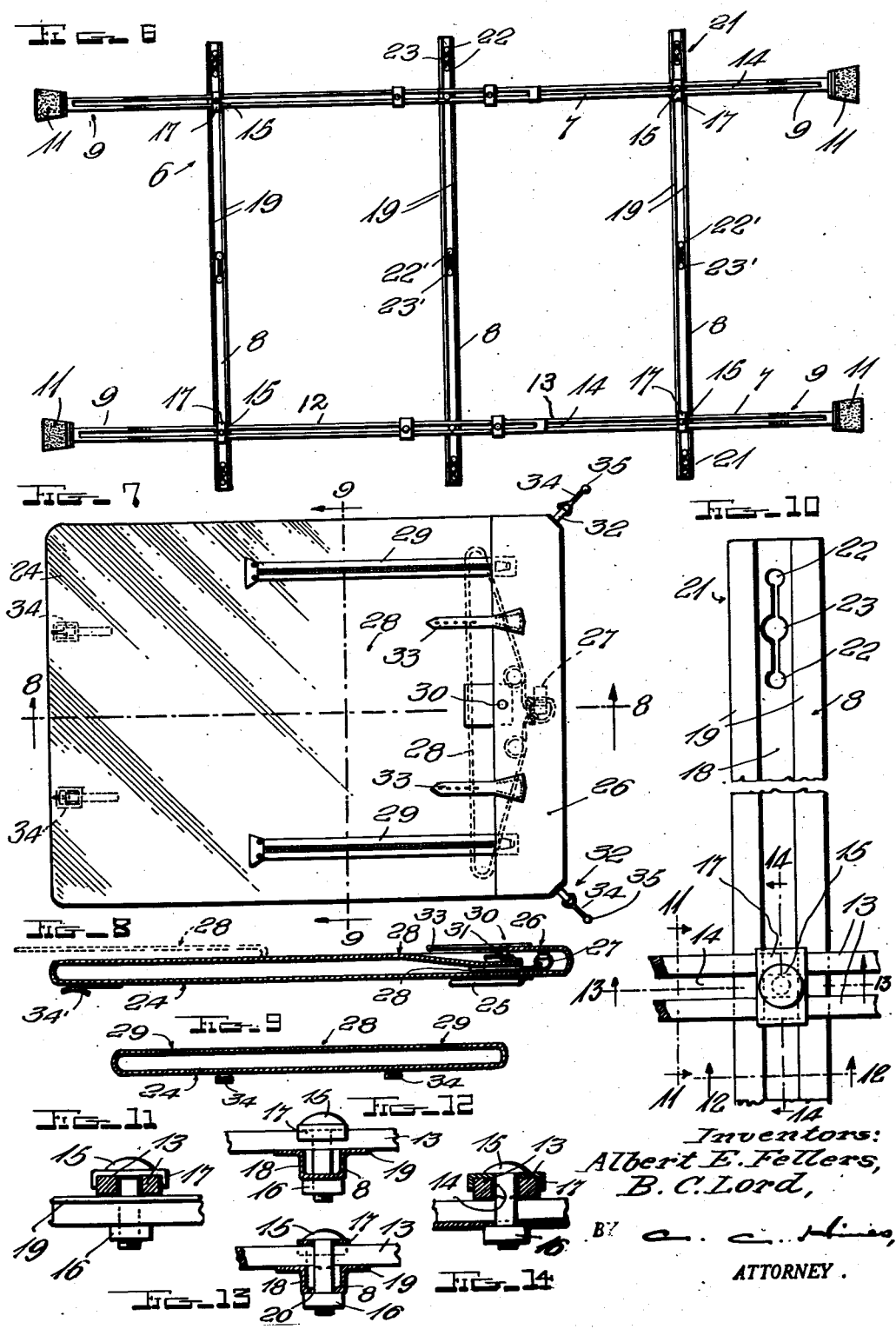

2,253,423

UNITED STATES PATENT OFFICE 2,253,423

ARTICLE CARRIER FOR AUTOMOBILES

Albert E. Fellers, Lansing, and Byron C. Lord, Clayton, Mich.

Application February 21, 1939, Serial No. 257,714

5 Claims. (Cl. 224—29)

This invention relates to a new and improved article carrier for automobiles, and particularly to an overhead carrier for supporting clothing or other articles in the ceiling or roof zone of an automobile.

Heretofore various types of hooks or like attachments supported from the window glass or from the sides of the body interior have been employed as hangers from which articles may be suspended in an automobile. This is not a satisfactory method as articles carried in this manner obstruct the view of the driver or passengers and are always in the way of passengers entering or leaving the vehicle. Devices have been suggested for supporting articles in an out of the way position in the roof zone, but these have been of objectionable type because of complexity of construction and inconvenience of use and because their application requires marring of the structure of the automobile.

One object of our invention is to provide an article carrier which may be applied for use for supporting articles in an out of the way position in the ceiling or roof zone of an automobile, and which is free from the objections to prior devices of this character.

Another object of the invention is to provide an article of this character which is simple of construction, capable of being readily applied for use without marring the automobile, and which will allow storage and removal of articles in a ready and convenient manner.

Still another object of the invention is to provide an article carrier which is adjustable for application to any width of vehicle, and which may be readily removed from the vehicle at any time when its further use is not required.

Still another object of the invention is to provide an article carrier which is self-holding in position, self-adjusting for engagement with portions of the vehicle which it engages, and which may be applied without piercing the upholstery fabric or other parts of the vehicle or otherwise injuring or marring the same.

Still another object of the invention is to provide an article carrier of universal type for application to different sizes of vehicles, which is neat and attractive in appearance, and which may be furnished at a comparatively low cost.

With these and other objects in view, which will appear in the course of the subjoined description, the invention consists of the novel features of construction, combination and arrangement of parts hereinafter fully described and claimed, and shown in the accompanying drawings, in which:

Fig. 1 is a horizontal transverse section on line 1—1 of Fig. 2 taken through an automobile body, looking downward from the ceiling thereof and showing the article carrier mounted therein.

Fig. 2 is a vertical transverse section on line 2—2 of Fig. 1.

Fig. 3 is a bottom plan view of the carrier frame and an article container applied thereto.

Fig. 4 is a detail section on line 4—4 of Fig. 5 through an end of one of the frame bars and the abutment member or foot carried thereby.

Fig. 5 is an end view of the parts shown in Fig. 4.

Fig. 6 is a plan view of the frame per se.

Fig. 7 is a plan view of the container removed from the frame and looking toward the reverse side of the same from that shown in Fig. 3.

Fig. 8 is a section on line 8—8 of Fig. 7, showing in dotted lines the cover flap turned back to open position.

Fig. 9 is a transverse section on line 9—9 of Fig. 8.

Fig. 10 is a view on an enlarged scale of a portion of the carrier frame.

Figs. 11, 12, 13 and 14 are detail sections on lines 11—11, 12—12, 13—13 and 14—14 of Fig. 10.

Referring now more particularly to the drawings, 1 represents the body of an automobile, 2 the interior lining of its roof or ceiling, 3 the interior lining of its side walls, which linings are commonly formed by upholstery fabric, and 5 molding strips or the like joining the lining fabric of the walls at the vehicle sides, or by which the fabric is fastened to the vehicle body frame above the window line, said strips providing and being utilized as supporting abutments in the use of our invention. Obviously other abutment supports might be provided for the purpose, but those present are preferably employed. Other equivalent interior supports which may be available, such as interior window moldings or body trim parts may also be utilized in some makes of automobiles.

In carrying our invention into practice we provide an article carrier comprising a hanger frame or rack 6. This frame or rack is formed of a pair of similar suitably spaced, parallel longitudinal bars or strips 7 connected and held in spaced relation by cross bars or strips 8. The bars or strips 7 are formed of flexible or spring metal and are substantially straight or flat throughout the major portions of their lengths, but are provided with downturned or downwardly curved end portions 9 so that the frame is longitudinally bowed. In practice the frame is of a length conforming to the interior width of the automobile to which it is to be applied, and its bowed conformation conforms substantially to the convex curvature of the ceiling and upper portions of the sides of the automobile, so that when applied for use it will lie close to or in contact with such portions of the body interior with its ends terminating just above and in proximity to the molding strips or abutments 5 at opposite sides of the body. To the ends of the hanger frame are pivotally attached, by bolts or rivets 10, transverse engaging members or abutment feet 10' designed to engage and rest on said abutments to support the hanger frame in applied position. The pivotal mountings of these abutment feet adapt them to tilt or take an angular position with relation to their frame bars, thus rendering them adjustable to compensate for any irregularities in the shape or level of the portions of the abutments 5 which they engage, so that the feet will have a firm and secure engagement with the abutments. The abutments are provided with soft friction sheathings or facings 11, of felt or rubber, to hold them from slipping and adapt them to engage the abutments and adjacent surfaces of the upholstery fabric without injury thereto.

The length of the frame is or may be so made or adjusted with relation to the width of the automobile body to which it is applied as to require that it be bowed to a slightly greater extent than its normal bowing curvature in order to apply it in position. The frame when applied will thus be placed under some stress so that it will be sprung into applied position. Therefore when the frame is fitted in position it will assume the shape of a flat arch and at its downturned curved ends where the feet are attached there will be two holding thrusts due to the arching action, one horizontal against the sides of the car and the other vertical against the window moldings or body trim abutment beadings or moldings. By this means the hanger frame or rack will be secured firmly in working position without the use of fastenings of any kind. Through the application of bowing pressure also the hanger frame may be easily and quickly released for removal whenever desired.

Each longitudinal bar or strip 7 is formed of two sections 12 and 13, each section being longitudinally slotted, as shown at 14, said sections having lapping portions slidably connected by headed bolts 15 passing through the slots 14 thereof. The bolts are fitted with nuts 16 whereby the sections 12 and 13 may be clamped together against relative sliding or pivotal movements. Certain of these bolts are also utilized to slidably connect the cross bars 8 with the longitudinal bars and to fix said cross bars in adjustable position on the longitudinal bars. This construction provides an extensible and contractible frame whose length may be varied to suit the width or interior distance between the side walls of any automobile, and on which frame the cross bars 8 may be adjusted to vary their distance apart to suit variations in the length of the frame and to provide for the holding on the frame of different sized or differently spaced or arranged article holding containers or hangers. The bolts used strictly to connect the bar sections 12 and 13 and hold them clamped together may be associated with flanged washers or clip plates 17 to assist them in retaining the bar sections in alinement, and to more firmly and securely clamp them together. It is to be understood, of course, that each longitudinal bar or strip 7 may be of single piece instead of sectional construction in the event that it is desired to provide a non-adjustable frame of fixed length to fit an automobile of any certain interior width. Also it is to be understood that in the use of adjustable bars each bar may be made of tubular sections telescopically connected, or the bar sections may be made U-shaped or of any other channeled form so that they will slidably nest together, and sections of different or assorted lengths may be provided for assemblage to make a frame of any length and which is adjustable within any predetermined limits. The fastening connections between the bar sections under these conditions will, of course, be varied to suit the form of construction used.

Any suitable number of the cross bars 8 may be used. Three such bars are shown in the present instance which may be equally or variably spaced as circumstances may require. These bars 8 may be of any suitable form in cross-section, but are shown in the present instance as channeled and having the face edges of their side walls, i. e., those edges remote from their body portions 18, provided with flanges 19 to rest and ride upon the bars 7. This form of the bars 8 provides cross bars which are light in weight and strong and rigid so as to brace the bars 7 and increase the general strength of the hanger frame as a whole without interfering with its arching actions. The bars 8 are provided with holes 20 for passage of these bolts 15 which secure them to the bars 7. These holes 20 are preferably arranged some distance inwardly from the ends of the bars 8, whereby the bars 8 in the assembled frame will be of a length greater than the width of the frame, or be provided with end portions 21 which project beyond the bars 7 at the sides of the frame. In the body portion of each of these projecting end portions 21 of the bars 8 is formed a series of openings, in the present instance three circular openings, namely, two small end openings 22 and a central opening 23, said openings being connected by longitudinal slots and the central opening 23 being of larger size than the end openings 22. Another set of openings is also shown as formed in the body portion of each bar at the center consisting of two small openings 22' and 23' connected by a longitudinal slot. The latter-named set of openings may be three in number like the first, and any number of these sets of openings 22', 23' may be provided, if desired, at spaced points lengthwise of each bar 8 between the bars 7. The sets of openings above described are provided for the engagement with the frame of supporting hangers or holding means of article containers of any suitable type which it is desired to be applied to and carried by the hanger frame.

In the present instance we have shown the hanger frame as used for holding or suspending therefrom a garment container 24 of bag or sack type. This is of oblong rectangular form, made of suitable material and is of a width and length corresponding more or less generally to the width and length of the frame. This sack is provided at one end and on its rear side with a handle 25 by means of which it may be normally carried, and at such end and at its front side the sack is provided with a permanent flap 26. Underneath this flap and fastened to the rear wall of the sack a suspending hook or eye 27 is arranged with which one or more garment hangers 28 may be engaged. The front of the sack beneath the flap 26 is provided with an access opening adapted to be closed by a cover flap 28. The flap 28 may be turned down or opened to allow clothes or other articles to be inserted in or removed from the sack. The flap 28 is adapted to be secured in closed position at its side edges to the sack body by zipper fasteners or other like fasteners 29, and suitable fasteners 30 and 31, such as spring stud and socket fasteners, are provided for securing the free end of the flap 28 to the flap 26.

The sack may be used in outspread condition to hold articles therein in such condition, or after being packed it may be folded or rolled upon itself to provide a portable luggage carrier. The sack is provided at its two normally upper corners with suspending devices 32 by means of which it may be suspended in outspread condition from suitable hangers. It is also provided upon its flap portion 26 with straps 33 to engage buckles 34 upon its rear wall near its lower end whereby it may be fastened in rolled up or folded condition.

The sack 24 is merely shown for exemplificative purposes as one type of container which may be carried by our improved carrier frame or rack. To secure this in position use may be made of the suspending devices 32 to secure the sack at one end to the frame. Each of these suspending devices as shown comprises a strap loop carrying a link stem fastener 34ª having at its free end a spherical retaining head 35. The heads of these fasteners are engaged with the projecting ends of one of the end cross bars 8 by inserting it through the enlarged central openings 23 of the sets of openings therein and drawing the stems of the fasteners into the smaller inner openings of the sets, whereby the heads of the fasteners, which are longer than said smaller openings, will be held from release except by a reveres movement of this character. In case frame pieces of other cross-section than that shown are used the hooks or suspending devices employed may be varied accordingly to provide practical fasteners or suspending devices to suit the frame structure employed.

These smaller openings of the sets in the projecting ends of the cross bars are spaced such a distance relative to the width of the sack that the fasteners by being disposed at a proper angle and held in fastening engagement by the weight of the sack cannot become casually disengaged by movements of the vehicle. Similar fasteners at the opposite end corners of the sack may be used to connect the sack at that end to the projecting ends of the other cross bar 8 or to connect such end of a shorter sack to the projecting ends of the central cross bar. In case two short bags or sacks of the character disclosed are mounted on the frame, these may be provided with fasteners at their corners to engage locking openings on the end and central cross bars, and, if necessary, more than one set of openings in the projecting ends of the central cross bar may be provided for this purpose. In the present disclosure, however, we have shown an arrangement in which only the fasteners or suspending devices located at one end of the sack are utilized to fasten the sack to one of the end cross bars, while strap or band fasteners 36 are employed to support the bag at other points from the other end cross bar and the central cross bar. Each of these strap or band fasteners is preferably formed of a length of strong elastic webbing provided at each end with a fastener 34' similar to the fasteners 34. These straps may be adjusted as to length and are extended transversely beneath the sack and their fasteners engaged with the projecting ends of the central cross bar and end cross bar against which the bottom portion of the sack bears. The straps when adjusted are extended so as to place them under proper tension to support the weight of the sack and to hold the fasteners securely engaged with the locking openings in the cross bars. Straps of this type may be used for holding containers or articles of various forms secured to the hanger frame, and the invention is therefore not restricted to the use of the type of container disclosed or to any particular type of fastening means for connecting containers or articles to the frame. In the present instance each strap fastener is shown as provided at one end with a link fastener 34' permanently fastened thereto and doubled at its opposite end to provide a loop and an adjustable end portion 37. This adjustable end portion is connected with a slide clamp 38 fitted on the body of the strap whereby the end 37 may be adjusted and fastened to vary the length of the strap as desired. The loop receives a suitable fitting 39 by which the fastener 34' at that end of the strap is attached thereto. Other constructions of bands and other ways of adjusting the same may, however, be employed.

The openings 22' and 23' at the center of each cross bar and outer openings at the ends of the cross bars, even in the event of the use of the inner openings at the ends of the bars, may be employed for attaching other articles to the frame or for extending a holding belt or belts longitudinally of the frame and attaching the same thereto, and for other similar purposes.

What we claim is:

1. A device for supporting articles in an automobile comprising a longitudinally extensible and contractible longitudinally bowed inherently resilient frame formed of side bars and cross pieces connecting the same, said side bars embodying sections slidably connected for adjusting the frame as to length and having downturned end portions adapted to be engaged with supports on the inner faces of the automobile side walls and to be placed under stress by further bowing the frame and then releasing it into operative position to engage and hold said end portions in engagement with said side walls.

2. A device for supporting articles in an automobile comprising a longitudinally extensible and contractible longitudinally bowed inherently resilient frame having downturned end portions adapted to be engaged with supports on the inner faces of the automobile side walls and to be placed under stress by further bowing the frame and then releasing it into operative position to engage and hold said end portions in engagement with said side walls, and elastic cross bands having engaging members for detachable engagement with portions of the frame.

3. A device for supporting articles in an automobile comprising a longitudinally extensible and contractible longitudinally bowed inherently resilient frame formed of spaced parallel longitudinal bars and crossbars connecting the same, said longitudinal bars embodying sections slidably connected for adjusting the frame as to length and having downturned end portions adapted to be engaged with supports on the inner faces of the automobile side walls and to be placed under stress by further bowing the frame and then releasing it into operative position to engage and hold said end portions in engagement with said side walls, and pivotally mounted engaging feet on said end portion to directly engage the supports.

4. The combination with an automobile body having beads upon the interior of its side walls adjacent to but below the level of its ceiling, of a hanger for supporting articles in the automobile comprising a longitudinally extensible and contractible longitudinally bowed inherently resilient frame having downturned end portions, pivotally mounted engaging feet upon said downturned end portions, said frame adapted to be further bowed and then released into operative position to engage said feet with said beads, whereby the frame will be supported in its operative position by its spring pressure, and means of attachment on the frame for fastening articles thereto.

5. A device for supporting articles in an automobile having a transversely curved or arched top and provided with horizontally extending abutments upon the interior of its sides adjacent to the downwardly curved side edges of its top, comprising a normally longitudinally bowed inherently resilient hanger frame adapted to be disposed beneath the automobile top between the opposite sides of the automobile and having downwardly and outwardly bent end portions for supporting engagement with said sides and against the abutments, said frame being normally of greater length than the distance between the sides and adapted to be further bowed and then released by its spring reaction into operative position to engage and hold its end portions in engagement with said sides and abutments, the normally bowed form of the frame being such relative to the transverse curvature of the automobile top as to adapt it on further bowing to have its body portion assume a flattened arch shape conformable with the curvature of the body portion of the automobile top and to lie in close proximity thereto with its end portions extending downwardly and outwardly at an angle to the chord of the arc of curvature of its body portion and to the downwardly curved side edges of the automobile top so as to impose by its spring reaction upon its said end portions two holding thrusts, one horizontally against the sides of the car and the other vertically against said abutments, and means carried by the frame for supporting articles therefrom.

ALBERT E. FELLERS.
BYRON C. LORD.